March 6, 1928. 1,661,323
D. N. CROSTHWAIT, JR
METHOD AND APPARATUS FOR SETTING THERMOSTATS
Filed Sept. 30, 1925 4 Sheets-Sheet 2
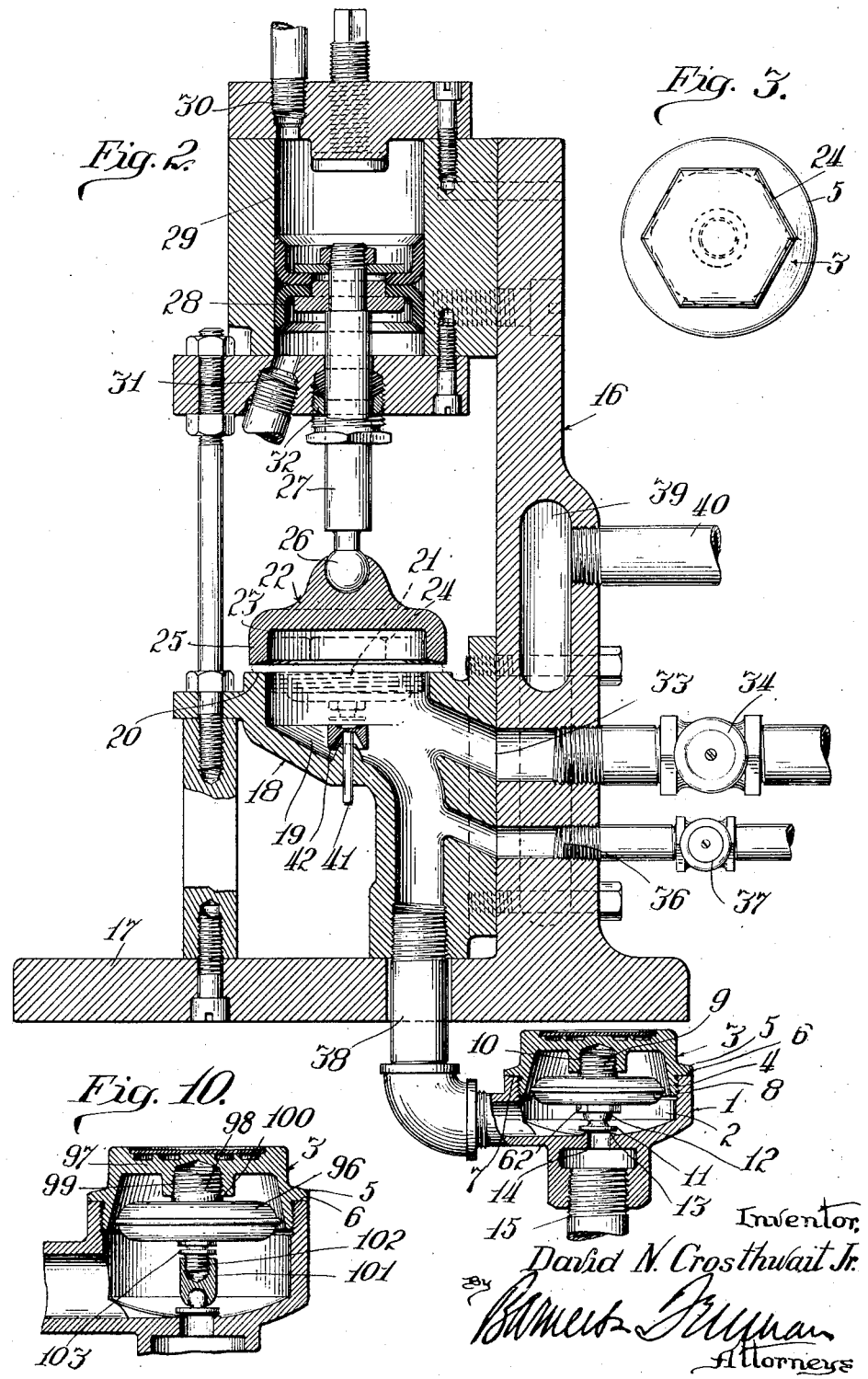

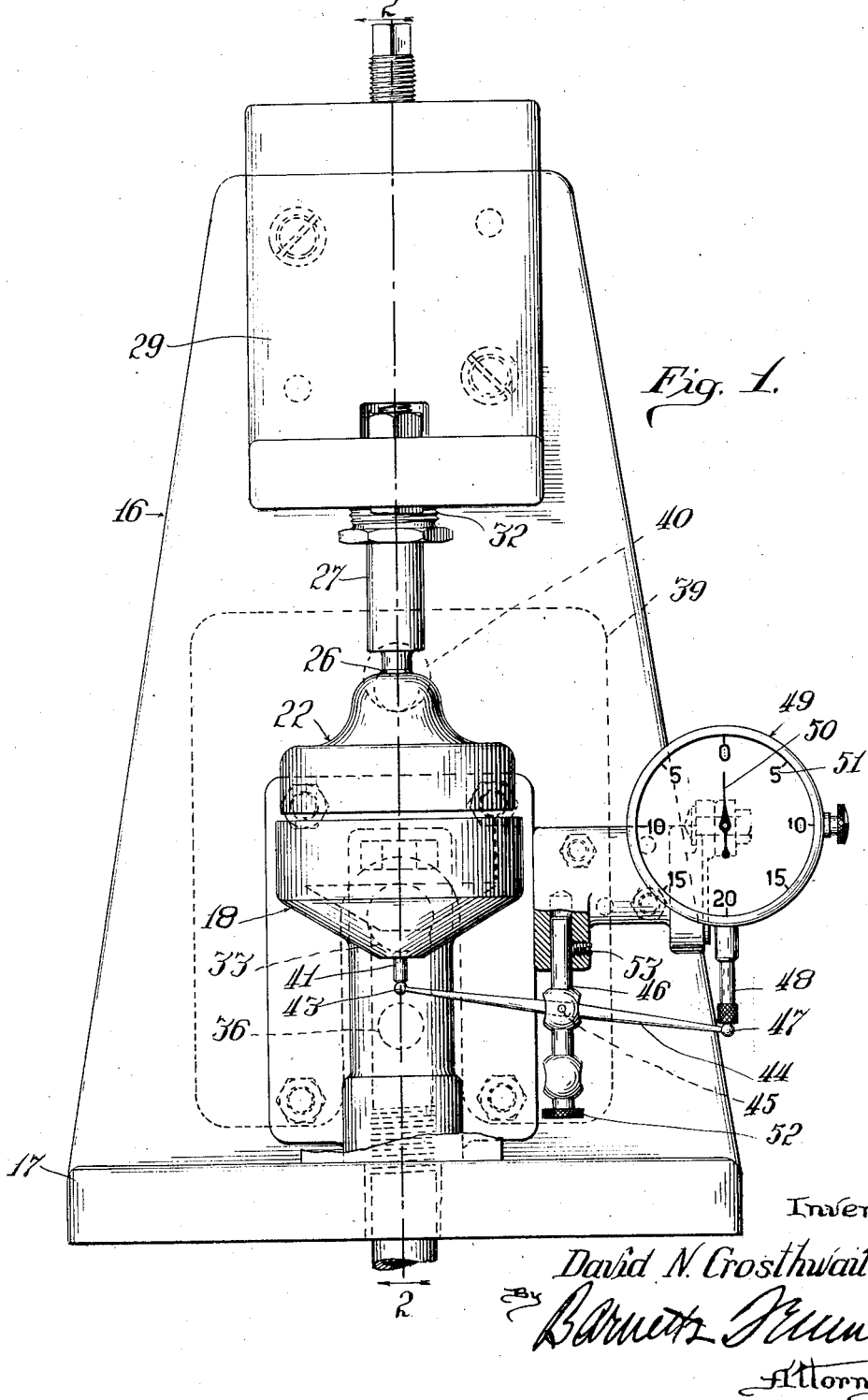

March 6, 1928.
D. N. CROSTHWAIT, JR
1,661,323
METHOD AND APPARATUS FOR SETTING THERMOSTATS
Filed Sept. 30, 1925　　4 Sheets-Sheet 3
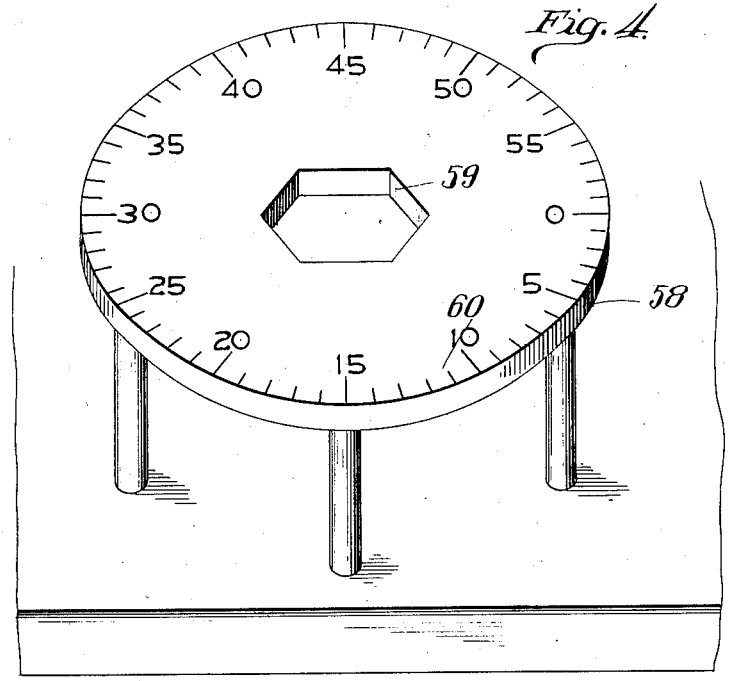
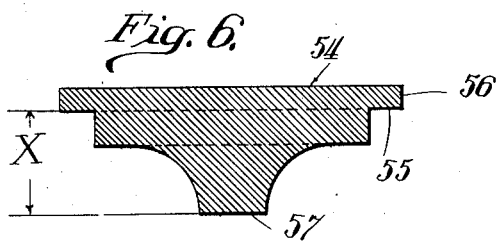
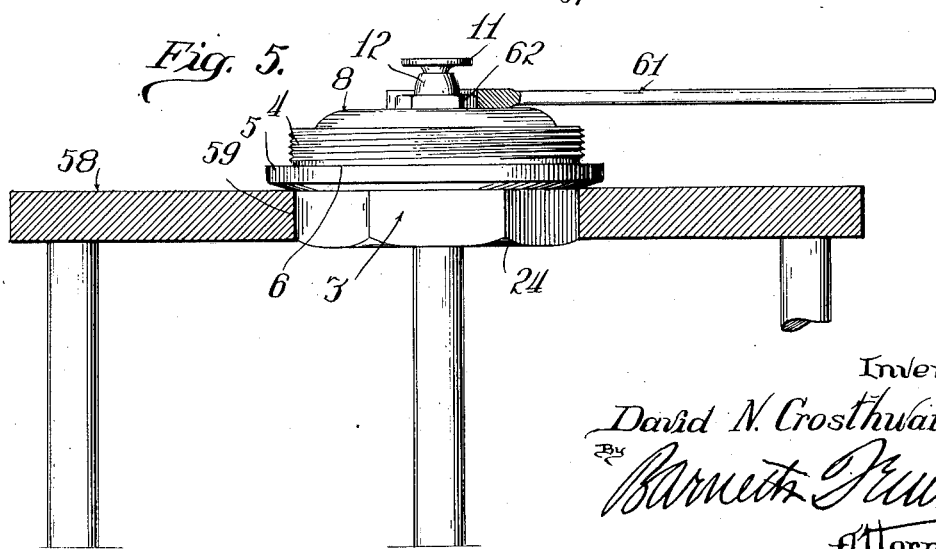
Inventor
David N. Crosthwait Jr.
By
Attorneys March 6, 1928. 1,661,323
D. N. CROSTHWAIT, JR
METHOD AND APPARATUS FOR SETTING THERMOSTATS
Filed Sept. 30, 1925   4 Sheets-Sheet 4

Inventor
David N. Crosthwait, Jr.
By Barnett Ullman
Attorneys

Patented Mar. 6, 1928.

1,661,323

UNITED STATES PATENT OFFICE.

DAVID N. CROSTHWAIT, JR., OF MARSHALLTOWN, IOWA, ASSIGNOR TO C. A. DUNHAM COMPANY, OF MARSHALLTOWN, IOWA, A CORPORATION OF IOWA.

METHOD AND APPARATUS FOR SETTING THERMOSTATS.

Application filed September 30, 1925. Serial No. 59,706.

This invention relates to a new and improved method and apparatus for properly adjusting or setting thermostats in their supporting members, and more particularly for setting the thermostats in thermostatic traps, although it is to be understood that this new method and apparatus is adapted for adjusting thermostats of different types and in different installations than that hereafter illustrated by way of example.

In the type of thermostatic traps here under consideration, a thermostat comprising a hollow diaphragm member containing a volume of expansible fluid is adapted, when heated by surrounding steam, to expand and move a valve against a valve seat, and thus cut off the flow of steam through an outlet passage. When the steam condenses, the cooler water will contract the thermostat and open the valve, allowing the water of condensation to run out. In assembling these thermostatic disks or diaphragms, the expansion member is filled with an expansible fluid, and when cold the vapor pressure in the disk approaches a vacuum. As the thermostat is heated the vapor pressure inside the disk will increase, and under operating conditions this internal pressure is a definite amount in excess of the exterior steam pressure.

The expansion diaphragms used in these thermostats, like all expansible and contractible containers made of metal, do not expand uniformly when subjected to the same temperatures, or internal pressures, even though made from the same dies. As a consequence, the operations of different thermostats, when installed in the same or similar traps, will vary. In order to secure uniformly operating traps, the thermostats should be set so that for a given steam pressure, and consequent temperature, the thermostat will move the valve disk against its seat at the limit of its expansion. The effects of variations from normal expansion of different thermostats can be eliminated, or compensated for, if the actual expansion of the disk is measured under actual working conditions, or under conditions simulating such working conditions, and the thermostat set in its supporting member so as to compensate for the variation from normal expansion. This new method of setting the thermostat embodies this principle, and the principal object of this invention is to provide a simple, accurate, and rapidly operating means and method for thus setting the thermostats. More specifically, this is accomplished according to the preferred method by simulating operating conditions about the thermostat, and measuring the variation of the expansion of the thermostat, as compared with a standard or normal expansion under such conditions, and then adjusting the thermostat in its supporting member to compensate for this variation. According to a variation of this method, the total expansion or "opening" of the thermostat is measured under simulated working conditions. The cold thermostat is subsequently set in its supporting member so that the distance from the valve plate to the valve seat will be equal to this previously measured "opening" or expansion. Or the same adjustment may be accomplished by an adjustable connection, or compensating means between the valve-plate and the thermostat, or between the thermostat and the support. Suitable instruments for expeditiously performing these operations will be hereinafter described.

In general, the object of this invention is to provide an improved method and means for determining the movement the expansion member or thermostat has under operating conditions and then setting the thermostat in its mounting so that the opening which the valve has when cold is equal to this measured expansion of the thermostat.

Another object is to provide an improved means for measuring the variation from normal of the thermostat's expansion under operating conditions.

Another object is to provide an improved means for measuring the total expansion of the thermostat under simulated working conditions.

Another object is to provide an improved means for measuring the "opening" for which a thermostat is set in its supporting member.

Another object is to provide an improved means for adjusting the thermostat in its supporting member to compensate for its variation from normal expansion, or from a desired "opening".

Other objects and advantages of this invention will be apparent from the following detailed description of certain approved forms of apparatus for carrying out the principles of this invention.

In the accompanying drawings:

Fig. 1 is a front elevation of the testing apparatus used in the preferred method.

Fig. 2 is a central vertical section through this apparatus, taken substantially on the line 2—2 of Fig. 1.

Fig. 3 is a plan view of a trap top.

Fig. 4 is a perspective view of the plate or support, forming a portion of the adjusting mechanism.

Fig. 5 is a central vertical section through this supporting plate, illustrating the method of adjusting the thermostat in the trap top to compensate for variations from normal expansion.

Fig. 6 is a section through a gauge, used to adjust the testing apparatus.

Fig. 10 is a section through a modified form of steam-trap.

Figure 7:
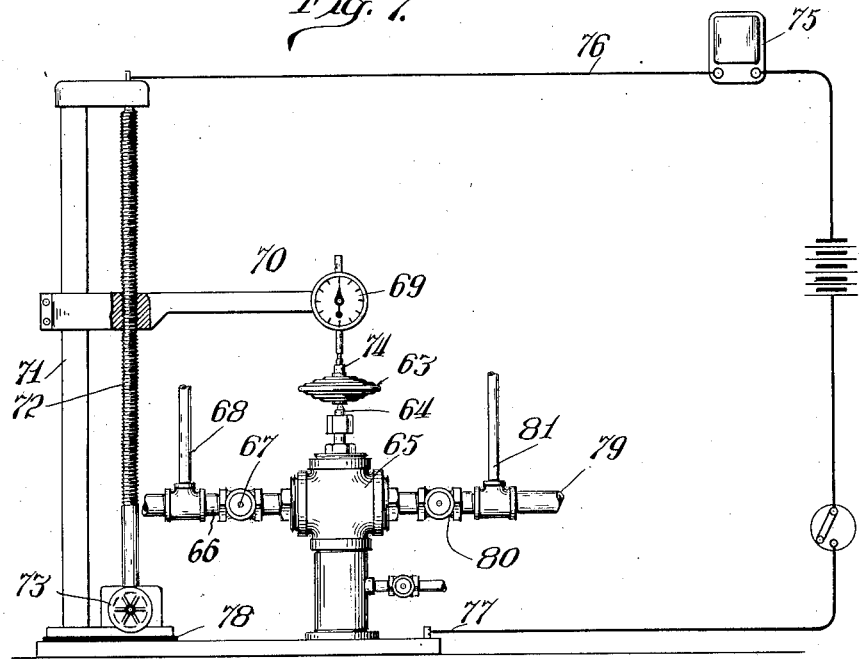
Fig. 7 is a diagrammatic view of a mechanism for measuring the expansion of the thermostat.

At the bottom of Fig. 2 is illustrated, in vertical section, a thermostatic steam trap of the type with which this invention is directly concerned, although it is to be understood that this new method and apparatus is adapted for adjusting and setting thermostats in different installations than here illustrated.

The casing 1 of this steam trap forms a housing for a steam space 2, the housing being closed at the top by a top or cap 3 having a flange 4 which screws into the casing 1. An outwardly extending flange 5 on top 3, has a lower surface 6 adapted to seat closely against the upper surface 7 of casing 1 when the trap is assembled. The thermostatic member or disk 8 is of any approved diaphragm type, adapted to expand when heated, preferably enclosing a volume of volatile liquid for causing the desired expansion, as is well understood in the art. A stud 9 extending from the center of one diaphragm of disk 8 is adapted to screw into the socket 10, projecting downwardly from cap or top 3, and thus hold the thermostat in place within the trap. It will be seen that the top 3 constitutes the supporting member for the thermostat, and it is the object of this invention to properly adjust the thermostat with relation to the supporting top, all as hereinafter described. A valve plate 11 is supported, preferably by a universal connection 12, from the opposite diaphragm member of disk 8. When the thermostat is expanded, valve plate 11 is adapted to seat against the valve seat 13 in casing 1 and close the outlet passage 14. When the thermostat 8 contracts, valve plate 11 will be moved away from valve seat 13 and the passage 14 will be open to allow water of condensation to flow from the trap through outlet pipe 15. The vertical distance from valve 11 to valve seat 13 when the thermostat is cold is the "opening" frequently referred to in this description. If the thermostat is properly adjusted, when space 2 is full of steam at the pressure for which this trap is adapted, the thermostat 8 will expand to its full extent and seat the plate 11 against valve seat 13. It is the purpose of this invention to provide a new and improved method and means for adjusting each thermostat 8 in its mounting 3, so that the valve plate 11 and valve seat 13 will properly cooperate to close the trap when subjected to normal working temperature and pressure. As stated hereinabove, these thermostats 8, although made from the same dies and as nearly as possible alike, will not expand equally, and it is necessary to adjust each assembled thermostat and trap top differently to insure proper seating of the valve.

In describing the preferred method, reference will be made especially to Figs. 1 to 6 of the drawings. In the testing apparatus shown in Figs. 1 and 2, 16 is a standard, rising from a supporting base 17, and on these members is mounted a casing 18 enclosing a steam space 19. Casing 18, at the open upper end of space 19 has an annular seat 20, against which is to be clamped the seating surface 6 on the lower surface of a trap top 3, in the same manner that this top is seated on the surface 7 of a trap casing 1. An assembled trap top and thermostat is indicated in dotted lines at 21 in Fig. 2, this being the position in which the assembly is placed for making the test. A retaining clamp 22 has a cavity 23 adapted to enclose the hexagonal head 24 of the top 3, and a depending skirt 25 adapted to clamp the flange 5 of the top 3 down upon the seat 20. Clamping member 22 is carried by ball and socket joint 26 at the lower end of piston rod 27 depending from the piston 28 in fluid pressure cylinder 29. Compressed air, or other operating fluid, is admitted through inlets 31 and 30 to cylinder 29, at either side of piston 28, to raise or lower the clamp 22. The usual stuffing-box 32 is provided between piston rod 27 and the casing of cylinder 29. While the above is the preferred means for raising and lowering the clamp 22, and holding same against the trap top 3, any other suitable form of clamping device, such as a hand-operated, or electrically operated clamp, might be used.

Steam for expanding the thermostat is admitted to the steam space 19 through inlet pipe 33 controlled by valve 34. In the same manner, water or other cooling medium may be admitted to the space 19 through inlet pipe 36 controlled by valve 37, when it is desired to contract the thermostat. Water of condensation, or water admitted through pipe 36, finds its outlet from steam space 19 through the pipe 38. One of the thermostatic traps, as first hereinabove described, is connected in the outlet pipe 38 to confine steam within the chamber 19, but automatically permits the escape of water of condensation. A steam jacket 39, supplied with steam through pipe 40, is provided in the standard 16 to keep the entire device heated to substantially steam temperature, thereby eliminating the thermal hysteresis.

Vertically mounted in casing 18, centrally beneath the thermostat assembly 21 to be tested, is a plunger 41, carrying at its upper end a head 42 against which the valve plate 11 is adapted to seat in the same manner in which it seats against the valve seat 13 of a steam trap. The plunger 41 rests on one end 43 of a lever 44, intermediately pivoted at 45 in a vertically adjustable fulcrum member 46. The other end 47 of the lever engages the operating plunger 48 of the test indicator 49, which embodies a pointer 50 movable around the graduated dial 51 of the indicator. Fulcrum member 46 is mounted in the vertically adjustable supporting post 52, which is locked in adjusted position by means of the locking screw 53.

When steam is admitted to chamber 19, the thermostat 8 will expand to its full extent, and the valve plate 11 which engages the head 42 of plunger 41, will through lever 44 operate the plunger 48 of the indicator 49. When this apparatus is properly adjusted, a thermostat assembly which is in proper adjustment will cause the pointer 50 of the indicator to register with the zero mark on dial 51, as indicated in Fig. 1. If the thermostat fails to expand the normal amount, the pointer 50 of the indicator will register a number of graduations to one side of the zero mark, indicating the thousandths of an inch variation from normal expansion. Similarly, if the thermostat expands more than the standard amount, the pointer will indicate graduations at the other side of the zero mark.

In order to adjust the apparatus to the required standard, a gauge of the type shown in Fig. 6 may be used. This gauge is a solid block of metal 54, of the same general outline as an assembled trap-top and thermostat. This gauge will be so machined that the vertical distance $x$ between the under surface 55 of the outstanding flange 56 and its base 57, will be just equal to the vertical distance between seat 7 and valve seat 13 of one of the trap casings 1. This gauge is placed in the apparatus in the same manner as the assembly 21 shown in dotted lines in Fig. 2, and the fulcrum member 46 is then adjusted until the pointer 50 registers zero on dial 51. Obviously, by the use of different gauges of this type, the apparatus hereinabove described may be adapted for testing different sizes of thermostatic traps, within a limited range.

It will be noted that this apparatus actually measures the expansion or opening of the thermostat and simultaneously compares this measurement with a previously measured standard opening.

In Fig. 4 is illustrated a suitably supported plate or table 58, having a central opening 59 of a configuration adapted to receive and grip the head 24 of the trap top 3, here shown as hexagonal in shape. The upper surface of plate 58 is provided with a graduated dial 60, preferably centered at the center of opening 59. After an assembled trap top and thermostat have been tested in the apparatus shown in Figs. 1 and 2, the assembly is removed, inverted, and the hexagonal portion 24 of the top 3 is placed within the aperture 59 of plate 58. A suitable wrench 61 is now engaged with the nut 62 on the base of thermostat 8, and by moving this wrench in one direction or the other, the stud 9 is screwed in or out of the socket 10 in top 3, whereby the distance between the plane of seat 6 and the seat-engaging surface of valve plate 11 may be varied. In the device here shown, the dial 60 is so graduated that each space on this dial represents a vertical adjustment of one one-thousandth of an inch of valve plate 11. The handle of wrench 61 serves as an indicator for showing the amount of angular adjustment of the thermostat. This adjusting apparatus is disclosed and claimed in the copending divisional application, Serial No. 218,845, filed September 10, 1927.

In the general performance of this preferred method, the thermostats 8 will be mounted in the trap tops 3 to approximately the correct setting, which may be determined by experience. One of these assemblies is now clamped in position in the casing 18, as indicated in dotted lines at 21 in Fig. 2. Steam is now admitted to the chamber 19 by manipulating valve 34, and since the entire device is maintained at approximately the steam temperature by the steam jacket 39, the thermostat 8 will quickly expand to its maximum operative position. If the setting is correct, pointer 50 of the indicator 49 will come to rest at the zero point. If, as is more likely to be the case, the setting is not exactly correct, pointer 50 will indicate a certain number of graduations at one side or the other of the zero mark. The clamp 22 is now elevated and the assembly is removed from this testing apparatus and placed in inverted position in the adjusting plate 58. Wrench 61 is now applied to the nut 62 on the thermostat 8, and the thermostate is rotated angularly through a number of divisions on dial 60 equal to the error indicated by pointer 50 of the test indicating dial. Of course, the direction of this adjustment will vary according to the direction of the error indicated on the testing apparatus. The assembled trap top and thermostate are now in proper adjustment for insertion in the casing 1 of the thermostatic trap. This process may be rapidly and easily carried out, requires no particular skill, and the assembled thermostat and supporting top are properly adjusted for use in any trap casing of this type, although the expansibility of the different thermostats 8 may vary.

By suitably varying the design of the testing and setting devices, thermostats and mountings of different designs than that here shown may be tested and adjusted without departing from the principles of operation hereinabove described. While the improved apparatus here shown is of a preferred type, other means might be applied for carrying out this new method, it only being essential that the thermostat be subjected to conditions similar to those under which it will operate and the variation of its expansion from the normal or desired expansion measured. This variation is then compensated for by adjusting the thermostat in its mounting, an equal distance in the opposite direction.

The calibrations on the dials 51 and 60 need not be in thousandths of an inch as described, nor need not be as shown in the drawings, it only being essential that these graduations be such that errors indicated on dial 51 may be translated into corrections on dial 60. It is desirable and convenient to have the number of graduations of error on dial 51 equal to the necessary number of graduations of correction on dial 60, thus saving effort in calculation and liability of error.

An alternative method, involving the general principles of this invention, will now be described with particular reference to the apparatus disclosed in Figs. 7 to 9 of the drawings. It will be remembered that in the method first described hereinabove, the assembled and sealed thermostat is first set or adjusted in the trap top to an approximately correct position and then tested under simulated operating conditions to ascertain its variation or error from the desired expansion or "opening" desired. The setting is then corrected to compensate for this variation or error. According to the alternative method now to be described, the total expansion or opening of the thermostatic disk is first measured under simulated operating conditions. After the disk has been filled and sealed, it is assembled or set in a trap top to an approximately correct position, and then its "opening", when cold, is measured by a suitable gauge or indicator. The setting is then adjusted to compensate for the difference between this measured opening, and the actual measured opening of the heated disk which was determined before it was set in the trap top.

Figure 8:
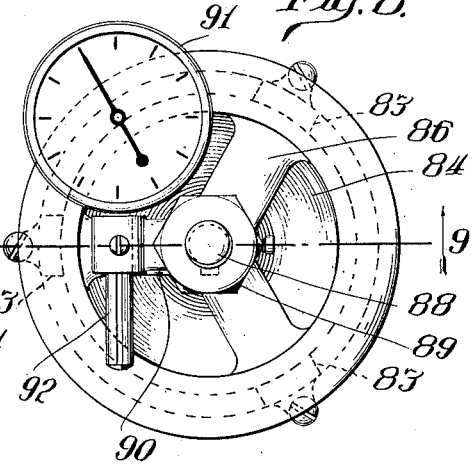
Fig. 8 is a plan view of the gauge for measuring the "opening" for which thermostat has been set in its support.

Referring first to the apparatus shown in Fig. 7, a thermostatic disk 63, before it is filled with the expansible fluid, is mounted as shown with its open side connected by disk adapter 64 with the casing 65 of the testing apparatus. Casing 65 is in communication through pipe 66, controlled by quick opening valve 67, with an exhauster or other source of vacuum, and 68 illustrates the connection to a vacuum gauge, preferably of the mercury column type. 69 is a dial indicator mounted on the horizontal arm 70, supported from and vertically slidable along a vertical column 71. The dial is bodily adjusted up and down by means of the screw 72 which engages a nut in arm 70, the screw being operated through suitable gearing from the hand wheel 73. The disk 63 is first exhausted by opening the valve 67, and then the dial is adjusted downwardly by hand wheel 73 until the dial plunger 74 contacts with the disk. The proper adjustment may be indicated by a buzzer 75 which is wired so that its circuit will be closed by the contact of plunger 74 with thermostat disk 63. As shown, one wire 76 from the buzzer is connected with the supporting means for the dial 69. The other terminal 77 of the buzzer circuit is connected with the casing 65. Suitable insulation 78 must be used between the dial supports and the supports for casing 65, so that the circuit can only be completed through the dial and thermostatic disk. After the mechanism is thus set for the zero expansion of the disk, fluid under pressure, preferably compressed air, is admitted to casing 65 and thermostat 63, through pipe 79 controlled by quick opening valve 80. The air pressure should be equal to the effective pressure of the expansible fluid in the disk under normal operating conditions, this pressure having been previously ascertained by suitable measurements. At 81 is a connection to a mercury gauge for determining the correctness of this air pressure. The dial 69 will now indicate the total expansion or "opening" of the disk.

The thermostatic disks as they are tested by this instrument, will be sorted according to the movement they are found to have. Each disk having a given movement or opening, within certain limits, will be placed with all other disks having the same movement. The disks will then be filled with expansible fluid, exhausted, and sealed, but will be kept sorted.

The disks are now to be assembled in the trap tops, and, if all of a given sorted class are handled at one time, the approximately correct setting can soon be ascertained. The opening for which the disk or thermostat is set is now measured by means of the gauge shown in Figs. 8 and 9. The casing 82 of the gauge has a plurality of spaced projections 83 adapted to seat against the surface 6 on outwardly projecting flange 5 of the trap top. (See Fig. 2.) A plunger 84 slidable vertically in recess 85 of casing 82, is normally held up against the top 86 of the casing, by means of a spring 87 which surrounds a stem 88 projecting upwardly from plunger 84, the spring being confined between the top of casing 82 and lock nuts 89 mounted on stem 88. The nuts 89 also hold in adjusted position on stem 88 the supporting bracket 90 for the dial indicator 91. Dial 91 is carried by a stem 92, horizontally adjustable through bracket 90, and the plunger 93 of the dial indicator thrusts against the upper surface 94 of casing 82. The parts will be so adjusted that in the position shown in Fig. 9, the indicator will read zero. The plunger 84 is formed centrally with a knife edge or series of prongs 95 which are adapted to contact with valve plate 11 on the thermostat. The distance from the plane of the ends of projections 83 to the plane of the ends of the prongs 95, when plunger 84 is retracted as shown in Fig. 9, will be equal to the vertical distance from seating surface 7 to the valve seat 13 of the trap, for which this thermostat is designed, that is, equal to the distance $x$ of the gauge 54 illustrated in Fig. 6, as previously described.

Figure 9:
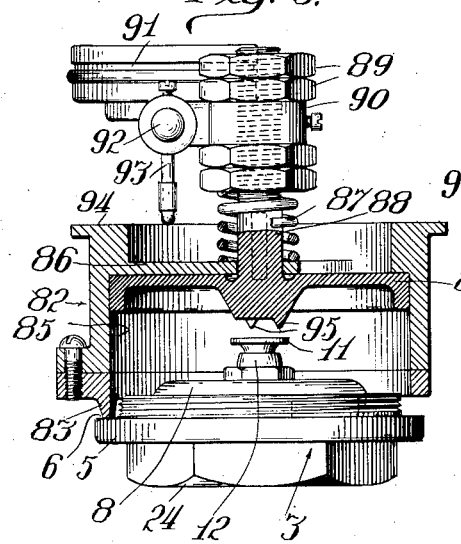
Fig. 9 is a vertical section on the line 9—9 of Fig. 8.

When the gauge 82 is assembled over a thermostat and trap top, as shown in Fig. 9, plunger 88 will be depressed against the spring 87 until prongs 95 contact with the valve plate 11. The dial test indicator 91 will then read the opening for which the thermostat is set. Preferably this dial indicates the opening in one-thousandths of an inch. This setting is then compared with the previously measured opening for that particular thermostat as determined by the apparatus shown in Fig. 7. The setting is then corrected the necessary amount by means of the adjusting plate and wrench shown in Figs. 4 and 5, the use of which has already been described in connection with the first disclosed modification of this invention. For example, if the stock of disks then being assembled should have an opening of .025 of an inch, and when tested by indicator 82 the dial 91 shows the disk to be set for an opening of .019 of an inch, the operator will place the assembled disk and trap top in the plate 58 of Figs. 4 and 5, and will then place the wrench 61 on the disk and move it through six spaces of dial 60 in the proper direction, thus increasing the setting .006 of an inch to give the required opening of .025 of an inch. This modified form of testing apparatus and the method performed thereby are disclosed and claimed in the copending divisional application, Serial No. 218,846, filed September 10, 1927.

Another alternative method, involving the principles of this invention, can be performed by adapting the testing machine shown in Figs. 1 and 2 for measuring the total expansion of the thermostatic disc under operating conditions. For this purpose the dial face 51 of indicator 49 is rotatably adjustable so that the zero graduation on the dial may be made to conform with the initial position of the pointer 50, no matter what that angular position may be. The assembled trap-top and thermostat are placed in the apparatus, as previously described, and after plunger 41 is made to contact with the valve plate 11, dial 51 is set so that the zero mark coincides with the position of pointer 50. Then when the steam is turned on and the thermostat expanded, the indicator 49 will register the total expansion of the thermostat. The "opening" for which the disk or thermostat is set is now measured by means of the gauge shown in Figs. 8 and 9, the operation of which has already been described. The variation between this opening and the expansion of the thermostat as measured under operating conditions will now indicate the proper correction in the setting to be made by means of the adjusting apparatus disclosed in Figs. 4 and 5. In other words, the test made with the apparatus of Figs. 1 and 2 under operating conditions will indicate full expansion of the thermostat under such conditions, whereas the test made with the apparatus shown in Figs. 8 and 9 shows the possible movement of the thermostat as then set in the trap top. If this distance, or opening, is greater or less than the expansion of the thermostat, the proper correction should be made to make the two agree.

In Fig. 10 is indicated a slightly modified form of steam-trap. In this form, the thermostatic disk 96 is fixedly connected with the trap top 97, as by having a threaded stud 98 screwed into the socket 99 until the disk is firmly seated against a shoulder on the top, as at 100. Any other form of substantially permanent connection might be made at this point, and it is intended that there be no adjustment of this connection between the disk and trap top. In order to permit the necessary adjustment of the setting, a threaded compensating sleeve 101 is interposed between the valve plate and the thermostatic disk 96. As here shown, sleeve 101 is adjustably threaded upon a stud 102 projecting from disk 96, and any suitable fastening means, such as lock nut 103, may be used to keep the parts in adjusted position. It will be obvious that any of the methods previously described for properly setting the thermostat may be adapted to this form of trap, but instead of adjusting the thermostatic disk in the cap or trap top 97, the compensating means 101 between the thermostat and the valve plate 11 will be adjusted to properly vary the distance between valve plate 11 and its seat in the steam trap. Obviously a similar compensating means could be applied between thermostat and the supporting means.

I claim:

1. The method of adjusting expansion thermostats consisting in assembling the thermostat with the member by which it is supported when in service, subjecting this assembly to the temperature and pressure under which the thermostat should expand to operative position, measuring the variation from standard of the expanded thermostat, and then adjusting the thermostat in the supporting member to compensate for the variation from standard.

2. The method of adjusting expansion thermostats consisting in assembling the thermostat with the member by which it is supported when in service, subjecting this assembly to the temperature and pressure under which the thermostat should expand to operative position, measuring its expansion under these conditions, and bodily moving the thermostat toward or from its supporting member to compensate for any variation from the desired expansion.

3. Apparatus for determining the expansion of expansion thermostats, comprising a device for holding the thermostat and its supporting member and for subjecting the thermostat to normal operating conditions, movable means in the device adapted to contact with the movable portion of the thermostat, and mechanism operated from the movable means for indicating the variation from a standard of the expansion of the thermostat.

4. An apparatus for measuring the expansion of thermostats comprising a casing in which the supporting member for the thermostat is clamped, means for subjecting the thermostat while held in the casing to normal operating conditions, and means for measuring at this time the variation from a standard of the expansion of the thermostat.

5. An apparatus for measuring the expansion of thermostats comprising a housing having one open side forming a seat for the supporting member of the thermostat, means for clamping the supporting member on this seat, means for subjecting the thermostat within the housing to the temperature and pressure under which it will normally operate, and means for measuring the variation from a standard of the expansion of the thermostat under these conditions.

6. An apparatus for measuring the expansion of thermostats comprising a housing having one open side forming a seat for the supporting member of the thermostat, means for clamping the supporting member on this seat, means for subjecting the thermostat within the housing to the temperature and pressure under which it will normally operate, and means for measuring the expansion of the thermostat under these conditions.

7. An apparatus for measuring the expansion of thermostats comprising a housing having one open side forming a seat for the supporting member of the thermostat, means for clamping the supporting member on this seat, means for filling the housing with gaseous medium at the pressure and temperature to which the thermostat will normally be subjected when in service, and means for measuring the expansion of the thermostat under these conditions.

8. An apparatus for measuring the expansion of thermostats comprising a housing having one open side forming a seat for the supporting member of the thermostat, means for clamping the supporting member on this seat, means for filling the housing with gaseous medium at the pressure and temperature to which the thermostat will normally be subjected when in service, a movable member within the housing with which the expanding thermostat contacts, an indicating dial, and operating connections between the dial and the movable member.

9. An apparatus for measuring the expansion of thermostats comprising a housing having one open side forming a seat for the supporting member of the thermostat, a fluid-pressure operated clamp for holding the supporting member against this seat, with the thermostat enclosed in the housing, means for filling the housing with gaseous medium at the pressure and temperature to which the thermostat will be subjected when in service, and means for measuring the expansion of the thermostat under these conditions.

10. An apparatus for measuring the expansion of thermostats comprising a housing having one open side forming a seat for the supporting member, means for clamping the supporting member against this seat with the thermostat enclosed in the housing, a support for the housing and clamping means, a steam jacket within the support for maintaining these members at approximately steam temperature, means for admitting steam to the housing to expand the thermostat, and means for measuring the expansion of the thermostat under these conditions.

11. An apparatus for measuring the expansion of thermostats comprising a casing, means in the casing for clamping the supporting member for the thermostat in a fixed position, means for subjecting the thermostat while held in the casing to normal operating conditions, and means for measuring at this time the expansion of the thermostat.

12. An apparatus for measuring the expansion of thermostats comprising a casing, means in the casing for clamping the supporting member for the thermostat in a fixed position, means for subjecting the thermostat while held in the casing to normal operating conditions, a movable member in the casing engaging the movable portion of the thermostat, and an indicator outside the casing and operated from the movable member for measuring the expansion of the thermostat.

13. An apparatus for measuring the expansion of thermostats comprising a housing having one open side forming a seat for the supporting member of the thermostat, a clamping device for holding the supporting member against this seat with the thermostat enclosed in the housing, means for filling the housing with a fluid at the pressure and temperature to which the thermostat will be subjected when in service, and means for measuring the expansion of the thermostat under these conditions.

14. An apparatus for measuring the expansion of thermostats comprising a housing having one open side forming a seat for the supporting member of the thermostat, a clamping device for holding the supporting member against this seat with the thermostat enclosed in the housing, means for filling the housing with a fluid at the pressure and temperature to which the thermostat will be subjected when in service, a member in the housing moved by the thermostat as it expands, and an indicator outside the housing and operated from the movable member for measuring the expansion of the thermostat.

15. The method of adjusting the setting in its supporting member of an expansion thermostat which is adapted to move the valve of a steam trap against its seat when expanded, consisting in subjecting the assembled supporting member and thermostat to simulated operating conditions, measuring the expansion of the thermostat under these conditions, and changing the setting of the thermostat in its supporting member so that the valve will have an opening when cold equal to this measured expansion.

16. The method of adjusting the setting in its supporting member of an expansion thermostat which is adapted to move the valve of a steam trap against its seat when expanded, consisting in subjecting the assembled supporting member, thermostat and valve to simulated operating conditions, measuring the movement of the valve due to the expansion of the thermostat under these conditions, and subsequently changing the setting of the thermostat in the supporting member to compensate for any variation from the required movement of the valve when in service.

DAVID N. CROSTHWAIT, Jr.